United States Patent [19]

Permut et al.

[11] 3,763,954

[45] Oct. 9, 1973

[54] VEHICLE SPEED AND CRUISE CONTROL SYSTEM

[76] Inventors: Albert A. Permut; Ronald M. Permut, both of 11718 Greenland Dr., Potomac, Md. 20854; Alan R. Permut, 1065 University Ave., Boulder, Colo. 80302

[22] Filed: May 13, 1971

[21] Appl. No.: 143,079

[52] U.S. Cl.............. 180/98, 246/63 A, 246/187 B, 317/5
[51] Int. Cl............................................ B60k 31/00
[58] Field of Search.................. 180/98, 105, 105 E, 180/109; 317/5; 246/187 B, 182 R; 318/600, 602, 603; 340/171, 163

[56] References Cited
UNITED STATES PATENTS

| | | | |
|---|---|---|---|
| 3,263,141 | 7/1966 | Nicola | 340/171 R |
| 3,270,199 | 8/1966 | Smith | 180/98 X |
| 3,207,255 | 9/1965 | Hahlganss | 180/105 R |
| 3,476,204 | 11/1969 | Westby | 180/98 |
| 3,482,090 | 12/1969 | Wilcox | 246/187 B X |
| 3,599,154 | 8/1971 | Carol | 317/5 |

FOREIGN PATENTS OR APPLICATIONS

964,974  7/1964  Great Britain................. 246/187 B

Primary Examiner—Kenneth H. Betts
Attorney—John R. Manning, Monte F. Mott and Paul F. McCaul

[57] ABSTRACT

A vehicle speed control system is disclosed in which a first train of pulses, at a frequency directly related to actual vehicle speed, is generated. Also generated is a second train of pulses at a frequency which is directly related to maximum vehicle speed. The frequency of the second pulse train is controlled either manually or by the code of any one of a plurality of coded signals received by the system's receiver from a low power transmitter. When the frequency of the first train exceeds that of the second train, a restraining force is generated which is applied to the vehicle's throttle mechanism in opposition to the force or pressure applied by the operator's foot.

17 Claims, 7 Drawing Figures

ALBERT A. PERMUT
RONALD M. PERMUT
ALAN R. PERMUT
*INVENTORS*

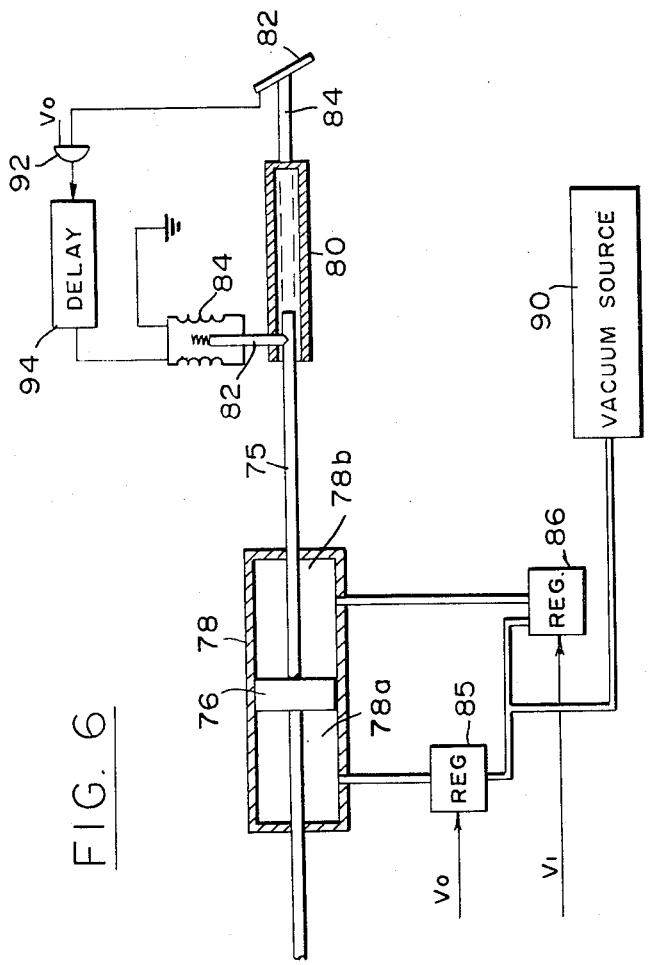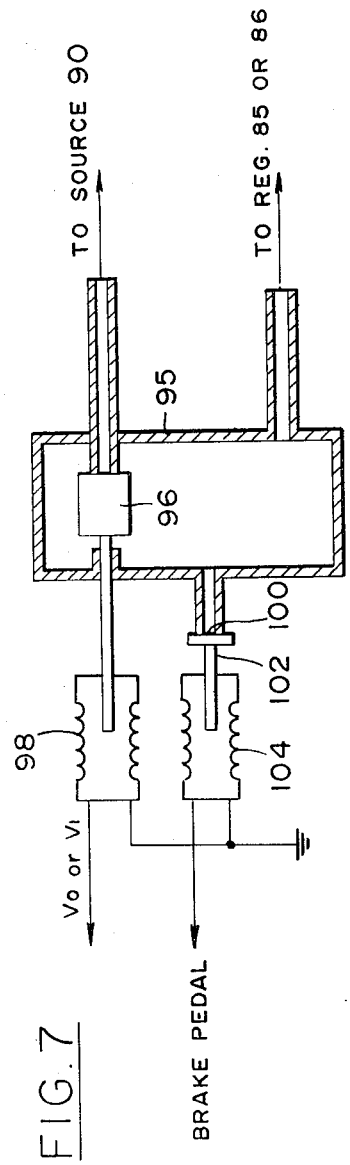

VEHICLE SPEED AND CRUISE CONTROL SYSTEM

ORIGIN OF INVENTION

The invention described herein may be manufactured and used by or for the United States Government without payment of any royalty thereon or therefor.

BACKGROUND OF THE INVENTION

1. Field of the Invention

The present invention generally relates to speed control devices and, more particularly, to a system for controlling the speed of highway vehicles and the like.

2. Description of the Prior Art

In the past various systems and devices have been proposed for the control of vehicular traffic. The basic principle underlying the operation of such systems or devices is the supply of a speed-defining signal which is transmitted to moving vehicles to control the speed of each vehicle. In practice, the transmitted signal which is received by the vehicle is the one which controls a vehicle-bearing system, which in turn provides a speed controlling output. Such systems suffer from several significant disadvantages. First, the transmitted signal, typically an RF modulated signal in analog form, is subject to noise interference, temperature drift and signal strength variations, due to continuous changes in the distances of the vehicles from the signal transmitters. These factors greatly effect the accuracy with which the speed is controlled. Also, since the same speed-defining signal is transmitted to all vehicles, due to the inherent differences between vehicles, individual adjustment or tailoring of the control circuits in the various vehicles is required. These disadvantages greatly limit the practical use of prior-suggested systems. A need therefore exists for a new vehicle speed control system which does not suffer from the above disadvantages and limitations.

OBJECTS AND SUMMARY OF THE INVENTION

It is a primary object of the present invention to provide a new improved vehicle speed control system.

Another object of the present invention is to provide a new vehicle speed control system which is substantially uneffected by amplitude variation and noise conditions of a signal transmitted to each vehicle.

A further object of the invention is the provision of a vehicle control system for each type of vehicle which does not require individual adjustments of control circuitry in each vehicle.

Still a further object of the invention is the provision of a new vehicle speed control system in which the transmitted signal is other than the basic control speed signal.

Yet a further object of the present invention is to provide a vehicle control system which is adapted for use on all types of traffic conditions, such as city streets, freeways and interurban highways and which is capable of controlling the speeds of vehicles in each of two directions at the same time.

These and other objects of the invention are achieved by providing a system in each vehicle which essentially operates in the digital domain. The system includes a unit which generates a first train of pulses at a frequency which is directly related to the actual vehicle speed. In addition the system includes a variable frequency oscillator or pulse generator which provides a second train of pulses at a frequency which depends on a control signal supplied to the generator. The frequencies of the two trains of pulses are compared and whenever the frequency of the first pulse train is greater than the frequency of the second pulse train an output signal is produced. This signal, whose magnitude is related to the frequency difference, is used to produce a restricting force on the vehicle throttle control mechanism which is in opposition to the foot force or pressure, applied by the vehicle operator. Thus, the operator is immediately made aware of the vehicle's excessive speed.

The system in each vehicle further includes a receiver which receives a coded signal whose decoded characteristics are applied to the pulse generator to control the frequency of the pulses supplied thereby. In accordance with the present invention, the coded signal is received from a low power transmitter which can be controlled in any conventional manner to provide the desired coded signal for controlling the speed of vehicles in the traffic zone which the transmitter is to control.

The novel features of the invention are set forth with particularity in the appended claims. The invention will best be understood from the following description when read in conjunction with the accompanying drawings.

BRIEF DESCRIPTION OF THE DRAWINGS

FIGS. 6 and 7 are diagrams useful in explaining a specific embodiment of some of the circuitry shown in FIG. 1.

DESCRIPTION OF THE PREFERRED EMBODIMENTS

Figure 1:
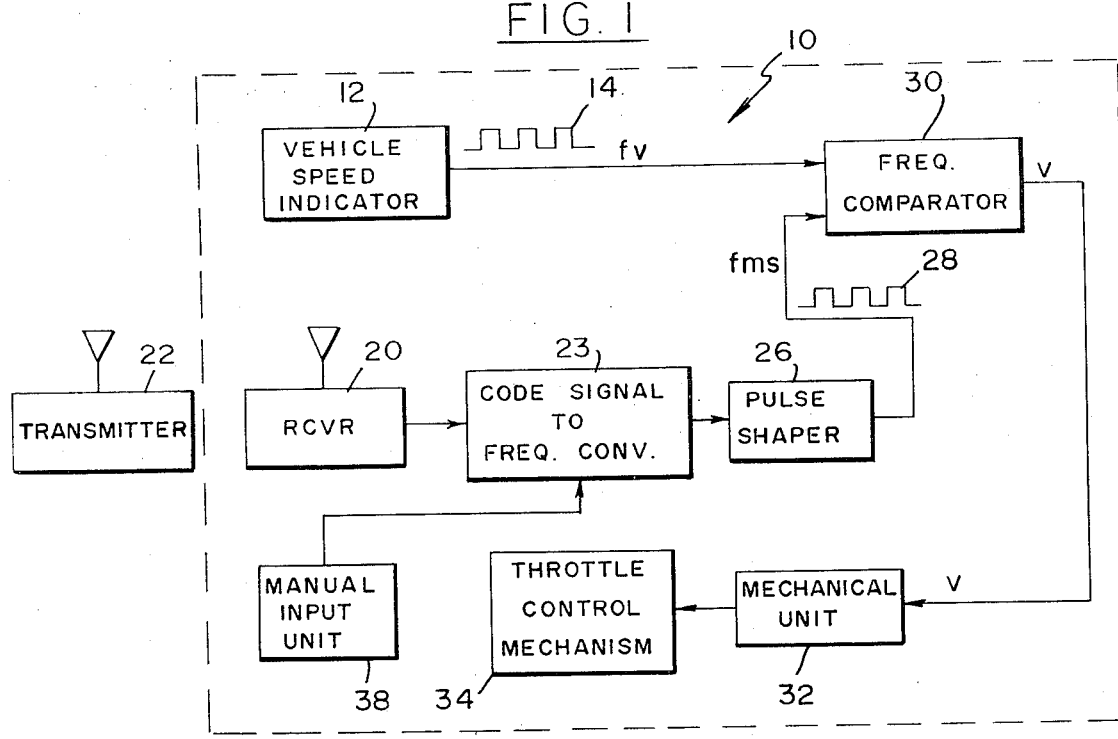
FIG. 1 is a block diagram of one embodiment of the invention.

Referring to FIG. 1, reference numeral 10 designates the system of the present invention which is diagrammed in block form. It includes a vehicle speed indicator 12 whose output is a train of pulses, such as squarewave pulses 14, produced at a frequency which is directly related to actual vehicle speed. This frequency will be referred to hereafter as the vehicle speed frequency and will be designated $f_v$.

Also included in the system 10 is a receiver 20 which is assumed to receive a carrier-modulated coded signal from a remotely located transmitter 22. After carrier demodulation the extracted coded signal is supplied to a code to frequency converter 23. Briefly, therein the coded signal is decoded and the decoded signal is used to activate a latchable variable frequency oscillator. The output frequency of the oscillator is directly related to the characteristics or code of the decoded signal. The converter 23 includes a latchable feature which enables the oscillator to supply a constant output frequency in response to the last received coded signal until a new coded signal is received. Thus, the input to converter 23 is a succession of discrete coded signals rather than a continuously supplied signal.

In practice each time the vehicle enters the transmission range of a different transmitter, a new coded signal, which may differ from a previously received coded signal, is received. However, until the new coded signal is received the output frequency of the oscillator corresponds to the last received coded signal.

The output of converter 23 may be shaped by a pulse shaper 26 whose output pulses have the same shape, such as squarewaves 28, as the pulses from unit 12 and at a frequency identical with the output frequency of the oscillator. The code of the coded signal which is transmitted and received by receiver 20 represents the desired maximum vehicle speed. Since the output frequency of the shaper 26 is directly related to the code of the coded signal, it will be referred to as the maximum speed frequency and will be designated by $f_{ms}$.

In accordance with the teachings of the present invention, the two frequencies $f_v$ and $f_{ms}$ are compared in a frequency comparator 30 whose output is an analog signal, such as a voltage V, whose amplitude is related to the difference between $f_v$ and $f_{ms}$. V is zero whenever $f_v \leq f_{ms}$ and is proportional to the difference $f_v - f_{ms}$ when $f_v \leq f_{ms}$. Thus, V = 0 when $f_v < f_{ms}$
V = $g(f_v - f_{ms})$ when $f_v > f_{ms}$.

This voltage is applied to a mechanical unit 32, such as a motor, whose function is to apply a force proportional to V to the vehicle's throttle actuator mechanism, designated by numeral 34 and hereafter simply referred to as the throttle mechanism. The force which is applied to the throttle mechanism is a restraining force which is in opposition to the operator's foot pressure.

In operation as long as the vehicle speed is not greater than the desired maximum speed, as defined by the code of the last received coded signal $f_v \leq f_{ms}$. Thus V is zero and no restraining force is applied to the throttle mechanism in opposition to the operator's foot pressure. However, as soon as the vehicle speed exceeds the maximum speed, a restraining force in opposition to the operator's foot pressure is applied. Consequently, the operator becomes immediately aware of the excessive vehicle speed. The restraining force, whose magnitude is directly related to the difference between the vehicle speed and maximum speed, reduces to zero as soon as the vehicle speed is not greater to the maximum speed, i.e., when $f_v \leq f_{ms}$.

As is appreciated in accordance with the teachings of the present invention, each different code of the coded signal defines a different maximum speed. This speed may vary from zero mph to a maximum of speed limit, e.g., 70 mph. If desired, the maximum speed may be incremented in increments, e.g., 5 mph. Thus, to vary the maximum speed from 0 to 70 mph in 5 mph increments, the receiver 20 and unit 23 have to be able to receive up to 15 different coded signals, decode them and activate the oscillator to provide any one of 15 frequencies.

Since different vehicles have different wheel sizes and gear ratios, it is important that in each particular vehicle its $f_v$ for a particular speed corresponds to $f_{ms}$ provided by the oscillator when a coded signal corresponding to the particular speed is received. Upon installing the system 10, this may be accomplished by either adjusting the frequencies provided by $f_v$ as a function of vehicle actual speed, or by adjusting the frequencies to be provided by the oscillator in each of its 15 different latchable conditions. However once such initial adjustments are made, no further adjustments are required.

In practice for each make of vehicle with a specific axle ratio and wheel size, the system may include a differently set oscilator so that when a coded signal representing a desired speed is received, the oscillator in each vehicle produces an output frequency $f_{ms}$ which corresponds to the frequency $f_v$ which the vehicle would produce when its speed equals the desired speed. This would eliminate the need to adjust each individual system after it is installed in the vehicle. If desired, unit 23 may be made to respond to an external manual setting from a manual input unit 38. Such manual setting would define the maximum desired speed. As will be pointed out hereafter, when a manual external setting is employed, the system would control the maximum speed to be either that defined by the coded signal or the manually set speed whichever is smaller.

As is appreciated, various presently known devices and techniques may be used and adapted to provide $f_v$ as a function of vehicle actual speed. Likewise $f_{ms}$ may be generated with known devices and techniques to be any one of a plurality of discrete frequencies, e.g., 15, in response to any one of a plurality of received coded signals. As will be pointed out hereafter, digital circuitry is primarily employed to compare $f_v$ and $f_{ms}$ and provide a voltage output whose amplitude depends on the relationship between the two frequencies. Digital design techniques greatly increase circuit reliability. Once the voltage V is produced, any one of many implementations may be employed to provide a restraining force which is proportional to V to the vehicle's throttle mechanism in opposition to the operator's foot pressure.

From the foregoing description it should be apparent that the present invention differs from the prior art in several very significant aspects. In the prior art, the transmitted signal is the control speed signal and is the same for all vehicles. This requires repeated individual tailoring of the vehicle control circuits, resulting in less reliability, higher cost and greater inaccuracy. Also the transmitted signal is generally a continuous analog signal, which due to its analog characteristics is subject to normal amplitude changes due to temperature drift, signal strength changes and in addition subject to noise interference. Furthermore, unless very powerful transmitters are used in close proximity signal level changes occur over significant zone distances, thereby affecting the speed control of vehicles, travelling in opposite directions.

Unlike such disadvantages in the present invention, coded signals are transmitted. Due to their coding their reception is substantially immune to amplitude variations and/or the effect of noise. Also, since they need not be transmitted continuously due to the latching properties of unit 23, low power transmitters can be used. These need only be located at strategic locations such as highway on-ramps and off-ramps or lightly dispersed within specific speed zones to transmit to the vehicle a coded signal only where a change of speed may be required. However, between transmitters, no signal need be received since the maximum speed is defined by the last received coded signal.

Also, since with the present invention low power transmitters are required, transmitters controlling the speed of vehicles travelling in opposite directions may be located on opposite sides of a road. If desired, each unit 23 may incorporate a magnetic compass whose output would define vehicle heading. The coded signals could include a heading indication so that each vehicle would respond only to the coded signals for its direction. For example, assuming a highway in a north-south direction, vehicles travelling northward would respond only to coded signals with a northward heading indication, while those travelling southward would respond to the coded signals with a southward heading indication. Such an arrangement would insure failproof separate speed control for vehicles travelling in opposite directions.

In accordance with the present invention digital rather than analog techniques and devices are employed wherever possible to minimize the system's sensitivity to voltage level and waveform changes. Herein, the speed comparison is based on comparing frequencies which in essence represents pulse counting, which can be implemented with present day integrated circuitry to save space and cost.

Figure 2:
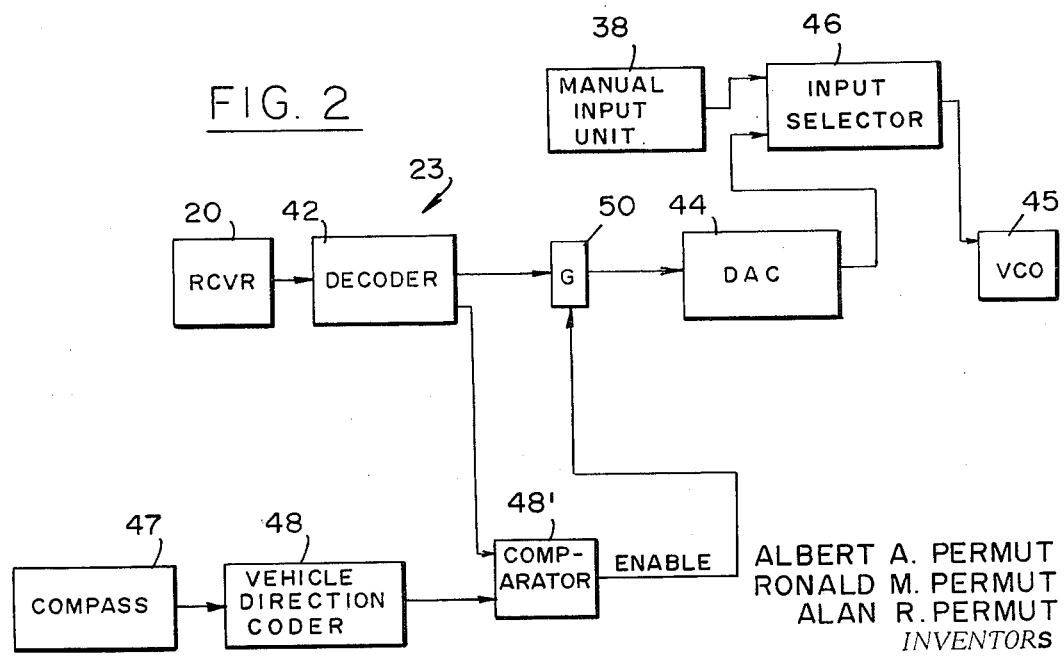
FIGS. 2–4 are block diagrams of various sub-systems shown in FIG. 1.

Attention is now directed to FIG. 2 which is primarily a block diagram of but one possible implementation of the unit 23, needed to provide $f_{ms}$ as a function of received coded signals. As previously stated, the receiver output which is the received coded signal is decoded by a decoder 42 and the signal code which is in digital form activates a digital-to-analog (D/A) converter 44, whose output is assumed to be a voltage. The amplitude of the output voltage of the converter is directly related to the code of the received signal. It is supplied to an oscillator 45, which is assumed to be a voltage controlled oscillator or VCO, through an input selector 46.

In operation when unit 38 is not set, selector 46 supplies oscillator 45 with the output of converter 44. However, when unit 38 is set, selector 46 supplies oscillator 45 with either the output of unit 38 or converter 44, whichever is smaller. This enables the system to define the maximum speed as that set manually as long as it does not exceed the speed defined by the coded signal. For example, assuming that the received speed is 50 mph, the operator may set the speed to be less than 50 mph. If however, he sets the speed for more than 50 mph, the received speed as defined by the output of converter 44 will be used for speed control. By selecting the converter 44 to include digital stages, such as flip-flops, which are clocked by the output of receiver 20 whenever a new coded signal is received, the converter's output will change only when a new coded signal is received, but will remain constant between the reception of two successive coded signals. Thus, the latching feature of unit 23 is achieved.

When unit 23 includes a compass 47 to indicate vehicle direction, its output activates a coder 48 which provides a code indicating vehicle direction. In such an arrangement the received coded signal includes a code of a direction in which traffic is to be controlled by the coded signal. The decoder 42 supplies the received direction code to a comparator 48' to which the vehicle direction code from coder 48 is also supplied. When the two codes are the same, comparator 49 enables a gate 50 to enable the received speed code from decoder 42 to be supplied to converter 44. Thus in this embodiment the converter responds only to received coded signals which are designed to control speed in the direction in which the vehicle travels.

As is appreciated by those familiar with circuit design, various known devices may be used to implement the frequency comparator 30 which, as previously described, is intended to provide an output voltage which is zero when $f_v \leq f_{ms}$ and one whose amplitude is directly related to $f_v - f_{ms}$ when $f_v > f_{ms}$. Thus, the following description in conjunction with FIG. 3 should be regarded as only one possible implementation and is not intended to limit the invention thereto.

Figure 3:
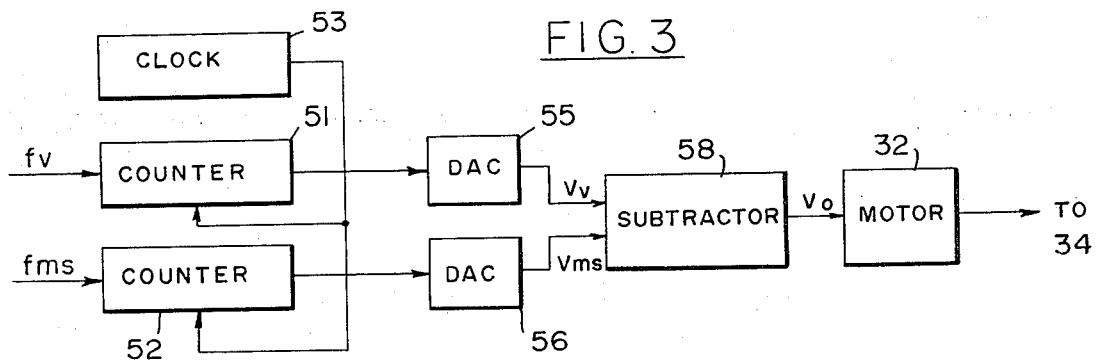

As shown in FIG. 3, the comparator 30 comprises a pair of counters 51 and 52 to which $f_v$ and $f_{ms}$ are supplied, respectively. The two counters are resettable by the output of a clock 53, which defines a pulse-counting period for the two counters. The respective outputs of counters 51 and 52 are supplied to D/A converters 55 and 56. Thus the output of converter 55 is an analog signal, such as a voltage, related to $f_v$, while the voltage output of converter 56 is related to $f_{ms}$. The pulse counting or measuring period, as defined by clock 53, is chosen as a function of the expected maximum frequencies, the bit length or maximum count of the two counters, and the desired accuracy so that during each counting period, the outputs of converters 55 and 56, designated $V_v$ and $V_{ms}$ truly represent $f_v$ and $f_{ms}$, respectively.

The outputs $V_v$ and $V_{ms}$ are supplied to a subtractor 58 which subtracts $V_{ms}$ from $V_v$ and provides an output $V_o$ which is a function of this difference. $V_o = 0$ when $V_v \leq V_{ms}$. However, $V_o > 0$ when $V_v > V_{ms}$, i.e., when the vehicle speed is greater than the desired maximum speed.

In FIG. 1 $V_o$ is shown supplied to the mechanical unit 32. The latter may assume the form of a unidirectional motor, as opposed to a reversible, motor which provides a torque, and therefore the restraining force which is applied to the mechanism 34. The restraining force is proportional to $V_o$.

From the foregoing it should be appreciated that in accordance with the present invention both the vehicle speed and the desired maximum speed, which is transmitted to the system as a coded signal are converted into respective frequencies. Digital counters determine these frequencies by counting them during each counting period. Only when the vehicle speed exceeds the maximum desired speed is a voltage generated, whose amplitude is related to the speed by which the vehicle speed exceeds the maximum speed. This voltage is converted into a restraining force applied to the vehicle's throttle mechanism in opposition to the operator's foot pressure, thereby making the operator immediately aware of the excessive speed.

In practice, the system may further include means to enable the operator to override the control for a preselected period of time at the end of which the control, i.e., the restraining force is again applied. Such override would be desirable whenever rapid acceleration is needed, such as in passing another vehicle or in case of a sudden emergency in which it is desired to move the vehicle from a danger area as fast as possible.

Figure 4:
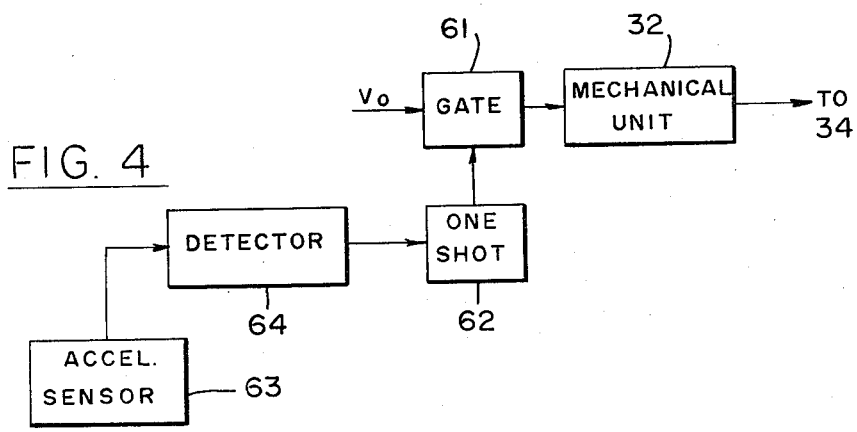

Such override may be provided by supplying $V_o$ from comparator 30 to mechanical unit 32 through a gate 61 (see FIG. 4) which is open except when closed by a disabling signal from a one-shot 62. The system may further include an acceleration sensor 63 which senses sudden changes in vehicle acceleration. The output of sensor 63 is supplied to a threshold detector 64 which supplies a trigger pulse to the one-shot 62 whenever the acceleration exceeds a selected value. When the one-shot is triggered, it provides a disabling signal to gate 61, the duration of the signal being a function of the one-shot pulse duration. Thus, during such a period gate 61 is closed thereby inactivating unit 32 which in turn reduces the restraining force to zero.

Figure 5:
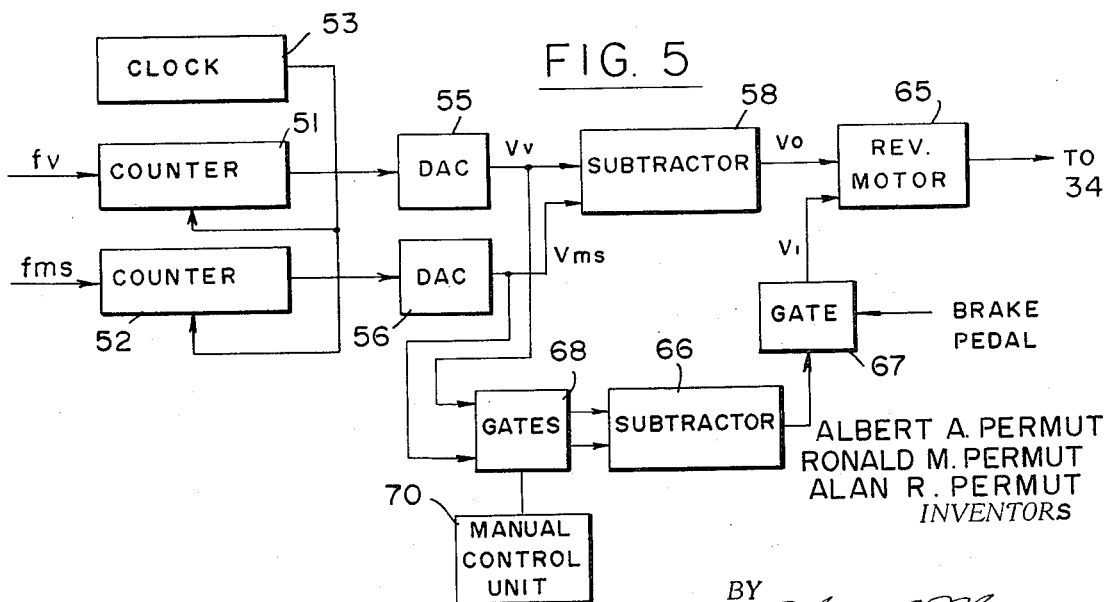
FIG. 5 is a partial block diagram of another embodiment of the invention.

The basic teachings of the present invention may be easily extended to provide a novel cruise control system. Such a system can be used to maintain the vehicle at a constant speed which may either be selected manually or transmitted to the vehicle. In such a system all the parts of system 10 shown in the foregoing figures are included. However, as shown in FIG. 5, the mechanical unit 32 comprises a reversible motor 65, to which the output $V_o$ of subtractor 58 is applied. Also, the motor is supplied with a second input which is the output of a subtractor 66, designated $V_1$ through a gate 67. Subtractor 66 which is supplied with $V_v$ and $V_{ms}$ from converters 55 and 56, subtracts $V_v$ from $V_{ms}$. $V_1=0$ whenever $V_{ms} \leq V_v$. However, when $V_{ms} > V_v$, the amplitude of $V_1$ is directly related to the speed by which $V_{ms}$ exceeds $V_v$.

It should thus be apparent that at any time either $V_o$ or $V_1$ is zero, except when $V_v = V_{ms}$ in which case both $V_v$ and $V_1$ are zero. Whenever $V_{ms}$ is greater than $V_v$, i.e., the vehicle speed is less than the cruise speed $V_1$ activates the motor 65 to turn in a first direction to apply a force to the throttle mechanism which activates it in the same direction as an operator's foot pressure to thereby increase the vehicle speed to the cruise speed. However, when $V_v > V_{ms}$, $V_1$ is zero and $V_o$ causes the reversible motor to turn in a second direction opposite the first direction. As a result, a restraining force is applied to the throttle mechanism in a direction opposite the direction in which an operator's foot pressure would be applied. Consequently, the vehicle speed is reduced. Gate 67 is incorporated between subtractor 66 and motor 65. Gate 67 is closed when the brake pedal is activated. This is done to prevent the vehicle speed from increasing whenever the opposite performance is desired, i.e., vehicle slow down. If desired, once gate 67 is closed it can be made to remain closed for a selected time period before full cruise control is again resumed.

As previously stated, the desired cruising speed may be transmitted to the system and received by the receiver to control $f_{ms}$ as previously described in conjunction with the speed control embodiment. Similarly, the desired cruising speed may be set manually by unit 38 (FIG. 2). If desired $V_v$ and $V_{ms}$ may be supplied to subtractor 66 through mode control gates 68 (FIG. 5) which are assumed to be controlled by a manual control unit 70. For the speed control mode, unit 70 disables or closes gates 68 to disable subtractor 66 thereby causing the system to perform the speed control function. On the other hand, when gates 68 are opened by unit 70, the system is in the cruise control mode.

It should be stressed that the cruise control system of the present invention is unlike any prior art system. In the prior art systems the vehicle speed must first be brought up to desired cruise speed before the cruise speed control system takes over automatic control. In the present invention the cruise speed control starts even when the vehicle is not in motion, i.e., when both $f_v$ and $V_v$ are zero, since the system is capable of raising the vehicle speed to the desired cruise speed as well as reduce its speed whenever vehicle speed exceeds the cruise speed.

Furthermore in the present invention, the maximum cruise speed can be changed by the coded signals. This would enable traffic officials to increase or decrease vehicular velocity for optimum traffic flow. It should be stressed that in the cruise mode, the cruise speed is either that defined by the coded signals or by the manually set speed, if the latter is less than that defined by the coded signals. Also, at any instant the cruise mode is interruptable by the brake pedal. In addition, if desired, the gates 68 may be controlled by specially coded signals received by receiver 20. This would enable traffic officials to institute the cruise control mode remotely. Yet individual drivers may individually interrupt this mode by touching the brake pedals of their vehicles. Such a system would greatly facilitate high density traffic movement and its control.

Attention is now directed to FIG. 6 which represents another embodiment for controlling throttle linkage movement and thereby vehicle speed in response to $V_o$ and $V_1$. In this embodiment numeral 75 designates a throttle linkage which is coupled to a piston 76 in a vacuum chamber 78. The linkage 75 is assumed to be connected at its left end to the vehicle throttle so that when the linkage moves to the left, vehicle speed is increased, and is decreased when the linkage 75 moves to the right. At the right end the linkage extends into a hollow tube-like member 80 which is also connected to the vehicle's gas or accelerator foot pedal 82 through an arm 84. The linkage 75 is locked to member 80 by means of a spring loaded piston 82 of a solenoid 84.

Basically, the piston 76 divides chamber 78 into two vacuum chambers 78a and 78b which are connected through regulators 85 and 86 to a vacuum source 90. In response to $V_o$ which occurs when $V_v > V_{ms}$, regulator 86 is opened thereby connecting chamber 78b to the vacuum source 90, so that the linkage is pulled to the right. On the other hand, in the cruise control mode, in response to $V_1$ which occurs when $V_{ms} > V_v$, regulator 85 is opened so that the linkage 75 is pulled to the left thereby increasing vehicle speed. To provide fast system override, such as is desired to bypass a vehicle or in case of an emergency, yet limit the override duration an AND gate 92 is provided. It activates a time delay unit 94 only when $V_o$ is present, i.e., $V_v > V_{ms}$ and the gas foot pedal is pushed down by the operator. After a period defined by the delay unit 94, the solenoid is activated, pulling piston 82 and thereby breaking the connection between linkage 75 and member 80. Consequently, any further operator force on the foot pedal would not affect the position of the linkage 75 since such force would merely cause member 80 to slide over linkage 75. Means may be provided to deenergize solenoid 84 and thereby reconnect linkage 75 to member 80 after a second time period and/or after the brake pedal is pressed.

Attention is now directed to FIG. 7 which is one example of either regulator 85 or 86. It comprises a chamber 95 and a piston 96 which provides communication between source 90 and one of the subchambers of chamber 78 when an appropriate signal ($V_o$ or $V_1$) is applied to a solenoid 98. Chamber 95 is provided with a vent port 100 which is opened by a piston 102 when a solenoid 104 is energized whenever the brake pedal is pushed. Thus, the operator when pushing on the brake pedal vents both subchambers of chamber 78 thereby disengaging the system from controlling vehicle speed.

Although particular embodiments of the invention have been described and illustrated herein, it is recognized that modifications and variations may readily occur to those skilled in the art. For example, the control of the position of linkage 75 may be provided by connecting it to two sealed diaphragms which are in turn connected to source 90 through regulators 85 and 86. One diaphragm would pull the linkage to the left when $V_{ms} > V_v$ and the other diaphragm would pull it to the right when $V_v > V_{ms}$. Also, hydraulic means may be provided to couple and decouple linkage 75 to and from member 80. Consequently it is intended that the claims be interpreted to cover such modifications and equivalents.

What is claimed is:

1. A vehicle speed control system comprising:
   first means coupled to said vehicle for generating a first sequence of pulses at a frequency which is directly related to actual vehicle speed;
   receiving means in said vehicle for receiving a coded signal which is transmitted to said vehicle, the code defining a received maximum vehicle speed;
   second means in said vehicle coupled to said receiving means for decoding said signal to provide a first output which is related to said received maximum vehicle speed;
   manually operable means for providing a second output which is related to a manually set maximum vehicle speed;
   pulse generating means in said vehicle;
   selecting means in said vehicle and responsive to said first and second outputs and coupled to said pulse generating means for activating said pulse generating means to provide a second sequence of pulses at a frequency which is directly related to a selected speed which is the smaller of said received maximum vehicle speed and said manually set maximum vehicle speed;
   third means in said vehicle for comparing the frequencies of said first and second sequences of pulses and for providing a third output which is a function of the speed with which said vehicle speed exceeds said selected speed; and
   fourth means in said vehicle for utilizing said third output to provide a force proportional to said output.

2. The arrangement as recited in claim 1 wherein the vehicle is of the type operable by an operator and including a throttle mechanism to which an operator-produced force is appliable to increase vehicle speed, said system including means for applying the force produced by said fourth means to said throttle mechanism in a direction which is opposite to the direction in which the operator-produced force is appliable.

3. The arrangement as recited in claim 2 wherein said receiving means include means for receiving any one of a plurality of coded signals, each coded signal of said plurality representing a different received maximum vehicle speed.

4. The arrangement as recited in claim 3 wherein said second means include means for providing said first output which is related to the last received maximum vehicle speed as represented by the code of the last received coded signal until the reception by said receiving means of a subsequent coded signal.

5. The arrangement as recited in claim 3 wherein the vehicle is of the type operable by an operator and including a throttle mechanism to which an operator-produced force is appliable to increase vehicle speed, said system including means for applying the force produced by said fourth means to said throttle mechanism in a direction which is opposite to the direction in which the operator-produced force is appliable.

6. The arrangement as recited in claim 4 wherein each coded signal includes a first direction code defining the direction in which said received maximum vehicle speed is to be maintained, said system further including means for providing a second direction code defining the actual vehicle direction, and means including code comparing means for controlling said second means to supply said first output only when said first and second direction codes are substantially the same.

7. The arrangement as recited in claim 1 wherein said third means further include means for providing a fourth output which is a function of the speed with which said selected speed exceeds said vehicle speed, and said fourth means comprise means which is responsive to said third and fourth outputs for providing a first force in a first direction which is a function of said third output and a second force in a second direction opposite said first direction which is a function of said fourth output.

8. The arrangement as recited in claim 7 further including gating means coupled to said third and fourth means for selectively inhibit the supply of said fourth output to said fourth means.

9. The arrangement as recited in claim 8 wherein the vehicle is of the type operable by an operator and including a throttle mechanism to which an operator-produced force is appliable to increase vehicle speed, said system including means for applying the first force in said first direction produced by said fourth means to said throttle mechanism in a direction which is opposite the direction in which the operator-produced force is appliable and for applying the second force in said second direction produced by said fourth means to said throttle mechanism in the same direction in which said operator-produced force is appliable, said vehicle further including a manually operable brake pedal, and means for activating said gating means to inhibit the supply of said fourth output to said fourth means, whenever said brake pedal is operable.

10. The arrangement as recited in claim 9 wherein said receiving means include means for receiving any one of a plurality of coded signals, each coded signal of said plurality representing a different received maximum vehicle speed.

11. The arrangement as recited in claim 10 wherein said second means include means for providing said first output which is related to the last received maximum vehicle speed as represented by the code of the last received coded signal until the reception by said receiving means of a subsequent coded signal.

12. The arrangement as recited in claim 11 wherein each coded signal includes a first direction code defining the direction in which said received maximum vehicle speed is to be maintained, said system further including means for providing a second direction code defining the actual vehicle direction, and means including code comparing means for controlling said second means to supply said first output only when said first and second direction codes are substantially the same.

13. A system for controlling the speed of a vehicle adapted to travel over long distances, the system comprising:

first means in said vehicle for generating a first sequence of pulses at a frequency which is directly related to actual vehicle speed;

receiver means in said vehicle for receiving aperiodically any one of a plurality of coded signals, which are transmitted to said vehicle, each coded signal representing a different desired vehicle speed;

second means in said vehicle for responding to the coded signal last received by said receiver means for providing a second sequence of pulses at a frequency which is independent of actual vehicle speed and which is a function of the desired vehicle speed represented by said last received coded signal, said second means providing said second sequence of pulses for the entire duration following said last received coded signal until a subsequent coded signal is received aperiodically by said receiver means;

third means in said vehicle for continuously comparing the frequencies of said first and second sequences of pulses and for providing a first output which is a function of the speed with which said actual vehicle speed exceeds said desired vehicle speed; and fourth means in said vehicle for providing a first force proportional to said first output.

14. The arrangement as recited in claim 13 wherein the vehicle is of the type operable by an operator and including a throttle mechanism to which an operator-produced force is appliable to control vehicle speed, said system including means for applying the first force produced by said fourth means to said throttle mechanism in a direction which is opposite to the direction in which the operator-produced force is appliable.

15. The arrangement as recited in claim 13 wherein said third means further include means for providing a second output which is a function of the speed with which said desired speed exceeds said vehicle speed, and said fourth means comprise means which is responsive to said first and second outputs for providing said first force in a first direction and a second force which is a function of said second output in a second direction opposite said first direction.

16. The arrangement as recited in claim 15 wherein the vehicle is of the type operable by an operator and including a throttle mechanism to which an operator-produced force is appliable to control vehicle speed, said system including means for applying the first force in said first direction produced by said fourth means to said throttle mechanism in a direction which is opposite the direction in which the operator-produced force is appliable and for applying the second force in said second direction produced by said fourth means to said throttle mechanism in the same direction in which said operator-produced force is appliable.

17. A system for controlling the speed of a vehicle operable by an operator, the system comprising:

first means in said vehicle for generating a first sequence of pulses at a frequency which is directly related to actual vehicle speed which is variable over a range of $n$ miles per hour, n being not less than 50;

receiver means in said vehicle for receiving aperiodically any one of a plurality of coded signals, which are transmitted to said vehicle, each coded signal representing a different desired vehicle speed in miles per hour, the smallest difference between the desired speeds represented by any two coded signals being not less than $z$ miles per hour, where $z$ is an integer, not less than one;

second means in said vehicle for responding to the coded signal last received by said receiver means for providing a second sequence of pulses at a frequency which is independent of actual vehicle speed and which is a function of the desired vehicle speed represented by said last received coded signal, said second means providing said second sequence of pulses for the entire duration following said last received coded signal until a subsequent coded signal is received aperiodically by said receiver means;

third means in said vehicle for continuously comparing the frequencies of said first and second sequences of pulses and for providing a first output having an amplitude which is a function of the speed with which said actual vehicle speed exceeds said desired vehicle speed;

fourth means in said vehicle for providing a first force proportional to the amplitude of said first output;

throttle means in said vehicle for controlling actual vehicle speed as a function of the force applied by said operator to said throttle means; and means for applying said first force to said throttle means in a direction opposite the direction in which the operator force is applied.

* * * * *